United States Patent
Makke et al.

(10) Patent No.: US 10,752,262 B2
(45) Date of Patent: Aug. 25, 2020

(54) IN-VEHICLE HAPTIC OUTPUT

(71) Applicant: Ford Global Technologies, LLC, Dearborn, MI (US)

(72) Inventors: Omar Makke, Oakland, MI (US); Haysam M. Kadry, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 131 days.

(21) Appl. No.: 15/762,709

(22) PCT Filed: Oct. 29, 2015

(86) PCT No.: PCT/US2015/057988
§ 371 (c)(1),
(2) Date: Mar. 23, 2018

(87) PCT Pub. No.: WO2017/074381
PCT Pub. Date: May 4, 2017

(65) Prior Publication Data
US 2018/0257669 A1  Sep. 13, 2018

(51) Int. Cl.
*B60W 30/08* (2012.01)
*B60W 50/16* (2020.01)
*G08B 6/00* (2006.01)
*G08B 21/02* (2006.01)
*G09B 21/00* (2006.01)

(52) U.S. Cl.
CPC .......... *B60W 50/16* (2013.01); *B60W 30/08* (2013.01); *G08B 6/00* (2013.01); *G08B 21/02* (2013.01); *G09B 21/009* (2013.01); *B60W 2420/54* (2013.01); *B60W 2520/10* (2013.01); *B60W 2556/65* (2020.02)

(58) Field of Classification Search
CPC ....... B60W 50/16; B60W 30/08; G08B 21/02; G09B 21/009
USPC ............................... 701/400; 340/691.6, 692
See application file for complete search history.

(56) References Cited

U.S. PATENT DOCUMENTS

| | | | | |
|---|---|---|---|---|
| 8,493,204 B2 * | 7/2013 | Wong | ................... | G01S 3/8036 340/539.11 |
| 8,494,507 B1 * | 7/2013 | Tedesco | ................... | A61F 4/00 434/112 |
| 8,577,593 B2 * | 11/2013 | Oesterling | ............. | G01C 21/00 701/400 |
| 8,588,464 B2 | 11/2013 | Albertson et al. | | |

(Continued)

FOREIGN PATENT DOCUMENTS

CN      204557727 U      8/2015

OTHER PUBLICATIONS

English version of Chinese Office Action dated Jun. 20, 2019 re Appl. No. 201580084099.0.

(Continued)

*Primary Examiner* — Thomas G Black
*Assistant Examiner* — Wae L Louie
(74) *Attorney, Agent, or Firm* — Brandon Hicks; Bejin Bieneman PLC

(57) ABSTRACT

A vehicle computer is communicatively coupled to a portable computing device and is programmed to detect, in a vehicle sensor, a sound outside of the vehicle and to actuate, in the portable computing device, a haptic output based at least in part on the detected sound.

20 Claims, 2 Drawing Sheets

(56) References Cited

U.S. PATENT DOCUMENTS

| | | | |
|---|---|---|---|
| 2008/0120029 A1 | 5/2008 | Zelek et al. | |
| 2011/0119289 A1 | 5/2011 | Fields et al. | |
| 2012/0218091 A1 | 8/2012 | Rothschild | |
| 2013/0144490 A1* | 6/2013 | Lord | B60T 17/22 |
| | | | 701/41 |
| 2014/0309870 A1* | 10/2014 | Ricci | H04W 12/0808 |
| | | | 701/36 |
| 2014/0310594 A1* | 10/2014 | Ricci | G01C 21/365 |
| | | | 715/702 |
| 2016/0358453 A1* | 12/2016 | Wassef | G08B 25/016 |
| 2018/0257669 A1* | 9/2018 | Makke | G08B 6/00 |

OTHER PUBLICATIONS

International Search Report and Written Opinion dated Jan. 14, 2016 re PCT/US2015/057988.

* cited by examiner

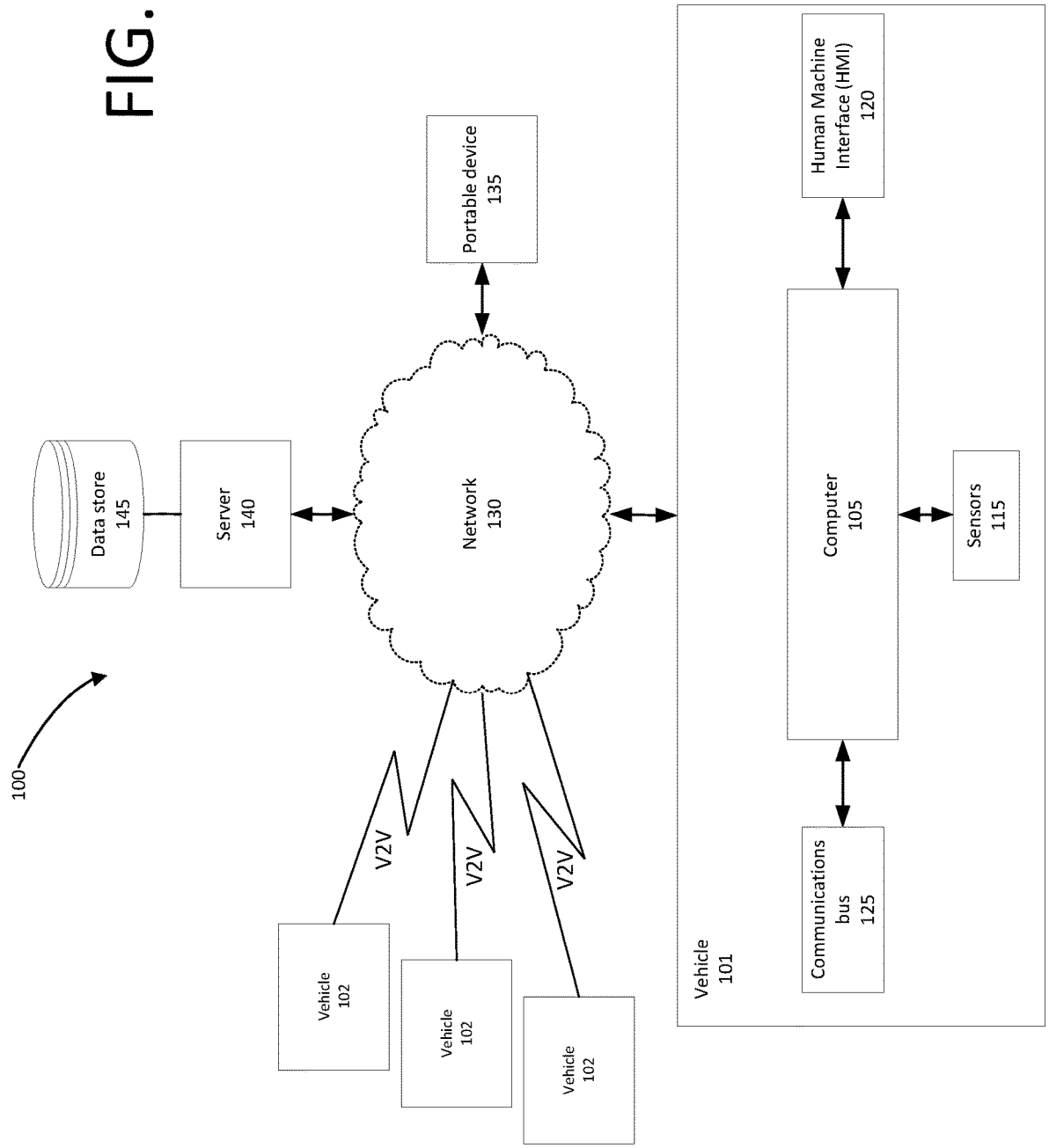

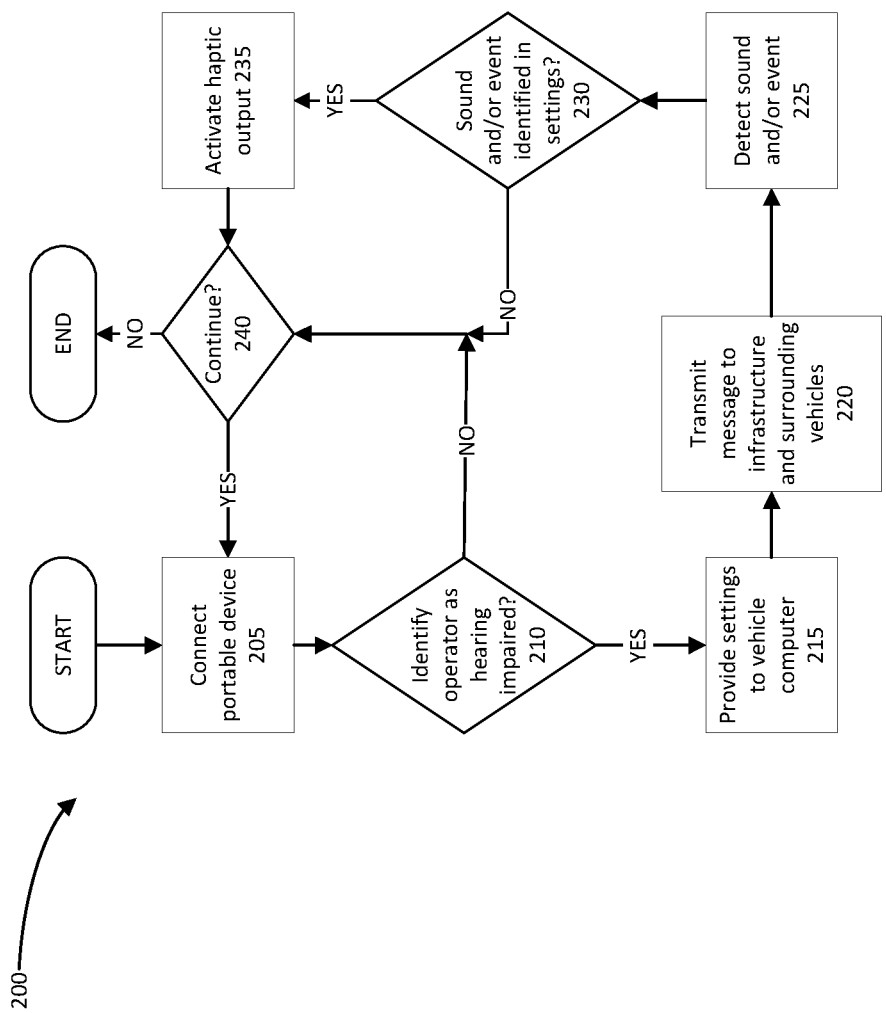

IN-VEHICLE HAPTIC OUTPUT

CROSS-REFERENCE TO RELATED APPLICATIONS

This application is a national stage of, and claims priority to, Patent Cooperation Treaty Application No. PCT/US2015/057988, filed on Oct. 29, 2015, which application is hereby incorporated herein by reference in its entirety.

BACKGROUND

In-vehicle notifications, e.g., warnings, directions, etc., and out-vehicle notifications, e.g., sirens, horns, etc., are often audible. Hearing impaired vehicle operators may be slow to react to the audible notifications and non-hearing-impaired operators may be unaware of hearing-impaired operators.

DRAWINGS

FIG. 1 illustrates an exemplary vehicle system for providing haptic output in a portable user device.

FIG. 2 is a diagram of an exemplary process for actuating haptic output in a portable user device in a vehicle.

DETAILED DESCRIPTION

Introduction

FIG. 1 is a block diagram of an exemplary vehicle system for operating a vehicle. The vehicle 101 may include a computer 105 that includes or is communicatively coupled to a human machine interface (HMI) 120, sensors 115, and/or a communications bus 125, e.g., communicating with various vehicle 101 components such as electronic control units (ECUs) for steering, brakes, powertrain, etc. The computer 105 communicates with other vehicles 102 using a communications protocol such as is known, e.g., dedicated short range communications (DSRC), etc. The computer 105 may further receive and provide data relating to operating the vehicle 101 via the vehicle communications bus 125, and yet further may communicate via a network 130 with one or more remote computers 140. A portable computing device 135 may be within the vehicle, e.g., carried and/or worn by a vehicle occupant, the device 135 typically in communication with the computer 105 via a protocol such as Bluetooth or WiFi, but also possibly via the network 130 which is external to the vehicle 101. Further, the computer 105 may communicate, e.g., via the network 130, with a remote server 140. The server 140 in turn includes or is communicatively coupled to a data store 145.

The vehicle 101 computer 105 may be programmed to provide various outputs, e.g., via the HMI 120, including audible notifications that may take the form of sounds, e.g., alarm bells or the like, or speech notifications. Such audible outputs may be triggered by a variety of conditions detected by the computer 105, e.g., data from the bus 125 and/or data from a global positioning system (GPS) unit such as is known, and which could be included with the computer 105, that may indicate that a vehicle 101 is traveling in excess of a predetermined threshold over a posted speed limit, e.g., more than 10 miles per hour above the speed limit, whereupon the computer 105 could be programmed to provide an audible notification. Other notifications could include, without limitation, information relating to engine temperature, impending collisions, seatbelt or other safety-device status, etc.

However, audible notifications pose difficulties for the hearing-impaired. Therefore, the computer 105 can be programmed to transmit a message to the portable device 135 to actuate a haptic output in addition to or in lieu of an audible output that could or would be provided via the HMI 120. Further, a specific haptic output that is provided could be selected according to a specific audible output, e.g., a length, number, and/or intensity of haptic vibrations could be varied according to an associated audible output, e.g., a notification of an approaching emergency vehicle, an instruction from the GPS unit, a notification of a vehicle 101 fault, e.g., high engine temperature, low fuel status, etc.

Exemplary System

The vehicle 101 computer 105, which includes a processor and a memory as is known, may be communicatively coupled to, e.g., via a communications bus 125 or other known wired or wireless connections, or the computer 105 may include, one or more electronic control units, e.g., controllers or the like included in the vehicle 101 for monitoring and/or controlling various vehicle 101 components, e.g., an engine control unit (ECU), transmission control unit (TCU), etc. The bus 125 may be a controller area network (CAN) bus and/or any other suitable in-vehicle communications bus such as JASPAR, LIN, SAE J1850, AUTOSAR, MOST, etc. Electronic control units may be connected to, e.g., the CAN bus, as is known. The vehicle 101 may also include one or more electronic control units specifically for receiving and transmitting diagnostic information such as an onboard diagnostics connector (OBD-II). Via the CAN bus, OBD-II, and/or other wired or wireless mechanisms, the computer 105 may transmit messages to various devices in the vehicle 101 and/or receive messages from the various devices, e.g., controllers, actuators, etc. Alternatively or additionally, in cases where the computer 105 actually comprises multiple devices, the CAN bus or the like may be used for communications between devices represented as the computer 105 in this disclosure, e.g., various ECUs.

The computer 105 may transmit and/or receive messages using a plurality of communication protocols, e.g., the computer 105 may include and/or be communicatively coupled to one or more transceivers as are known for providing such communications. For example, the computer 105 may transmit and/or receive messages using vehicle-to-vehicle protocols such as Dedicated Short Range Communication (DSRC), cellular modem, and short-range radio frequency.

The computer 105 may further communicate with the network 130 that extends outside of the vehicle 101, e.g., communicating with the server 140. The network 130 may include various wired and/or wireless networking technologies, e.g., cellular, Bluetooth, wired and/or wireless packets, etc. The network 130 may have any suitable topology. Exemplary communication networks include wireless communication networks (e.g., using Bluetooth, IEEE 802.11, etc.), local area networks (LAN), and/or wide area networks (WAN), including the Internet, providing data communication services.

The vehicle 101 may include a variety of sensors 115. The sensors 115 may be linked to electronic control units and operate within a CAN bus protocol or any other suitable protocol, as described above. The sensors 115 may both transmit and receive data. The sensors 115 may communicate with the computer 105 or other electronic control unit via e.g., the CAN bus protocol, to process information transmitted from or received by the sensors 115. The sensors 115 may communicate with the computer 105 or other electronic control unit via any suitable wireless and/or wired manner. The sensors 115 may include any assortment of a camera, a RADAR unit, a LADAR unit, a sonar unit, a breathalyzer, a motion detector, etc. Additionally, the sensors 115 may include a global positioning system (GPS) receiver that may communicate with a global positioning system satellite connected to the network, etc. At least some of the sensors 115 may be microphones or the like to collect sound by which the computer 105 can be programmed to measure audio characteristics, e.g., volume, tone, rhythm, etc., techniques for which are known, and communicate the measurement to the processor of a process component, e.g., the server 140, the computer 105, etc., to generate a corresponding haptic output. The sensors 115 may monitor sounds over a predetermined period, e.g., on a continuous basis such as every minute, etc.

The vehicle 101 may include the human machine interface (HMI) 120. The HMI 120 may allow an operator of the vehicle 101 to interface with the computer 105, with electronic control units, etc. The HMI 120 may include any one of a variety of computing devices including a processor and a memory, as well as communications capabilities. The HMI 120 may be a portable computer, tablet computer, mobile phone, e.g., a smart phone, etc., that includes capabilities for wireless communications using IEEE 802.11, Bluetooth, and/or cellular communications protocols, etc. The HMI 120 may further include interactive voice response (IVR) and/or a graphical user interface (GUI), including e.g., a touchscreen or the like, etc. The HMI 120 may communicate with the network 130 that extends outside of the vehicle 101 and may communicate directly with the computer 105, e.g., using Bluetooth, etc.

The computer 105 may be programmed to communicate with one or more portable computing devices 135 that are capable of generating a haptic output, e.g., vibrations. The portable device 135 may be a known device that is wearable by an operator, e.g., Apple watch, Microsoft Band, etc., and may be affixed to a wrist or other body part. The portable device 135 may alternatively or additionally be carried by a vehicle 101 occupant, and in general may include any one of a variety of computing devices including a processor and a memory, as well as communications capabilities, e.g., using IEEE 802.11, using Bluetooth, using cellular communications protocols, etc. The portable device 135 includes one or more haptic generators such as are known, e.g., actuators, tiny vibration motors, etc., to generate the haptic output. The portable device 135 may communicate directly with the vehicle 101 computer 105, e.g., using Bluetooth, etc. The portable device 135 may also communicate with the operator through visual, auditory, etc. mechanisms. The portable device 135 may include a visual interface, e.g., a screen, for displaying GUIs (graphical user interfaces).

The portable device 135 is programmed to activate one or more operations, e.g., haptic responses, etc., in accordance with operator input. The operator may input data into the portable device 135 via one or more applications, e.g., including a mobile app, etc., installed on at least one of the portable device 135, the computer 105, and the vehicle 101 HMI 120.

The server 140 may include or be communicatively coupled to the data store 145. Data received from the portable device 135, the computer 105, and/or the server 140 may be stored in the data store 145 for later retrieval.

Exemplary Process

FIG. 2 is a diagram of an exemplary process 200 that may be implemented in the computer 105 for sending haptic output.

The process 200 begins in a block 205 in which the portable device 135 is connected to the vehicle 101 computer 105. The portable device 135 connects to the computer 105 and may communicate with one or more in-vehicle systems, e.g., an in-vehicle communications and entertainment system, etc.

Next, in a block 210, the computer 105 determines whether a vehicle 101 operator is hearing impaired. For example, the portable device 135 may be running one or more applications (commonly referred to as "apps") and/or an operator may instantiate such application, e.g., by selecting an icon on a touchscreen, that communicate with the vehicle 101 computer 105, e.g., are on a predetermined list of apps programmed into the computers 105, whereupon the computer 105 may identify an app as for use in communicating with a hearing-impaired person. Alternatively or additionally, an identifier for the portable computing device 135 provided to the computer 105 could be used to identify a person associated with the device 135 as hearing impaired. If a hearing-impaired operator is detected or identified, the process 200 proceeds to a block 215. Otherwise, the process 200 proceeds to a block 240.

In the block 215, the server 140 and/or the portable device 135 sends to the vehicle 101 computer 105 settings data identifying the sounds and/or events based on data received, e.g., via the communications bus 125, that are to activate haptic output. For example, the events could be related to a variety of vehicle 101 operational data available from the bus 125, e.g., vehicle 101 speed, steering angle, navigational information, engine torque demand, etc. The settings for haptic output in the device 135 may be predetermined, i.e., pre-programmed into the computer 105, and/or an operator may configure the settings (or override default settings) by input to the device 135 and/or via the vehicle HMI 120. The settings may be stored in the data store 145 and/or the computer 105 memory. In any case, device 135 settings specify one or more haptic outputs corresponding to one or more detected sounds and/or one or more data received via the bus 125.

For example, a particular haptic output or series of such outputs, e.g., a vibration at a specified intensity for a specified period of time, may correspond to a single detected sound, or alternatively to the single sound and one or more data from the vehicle communications bus 125, e.g., the speed of the vehicle 101 and/or a speed of vehicle 102 (e.g., an emergency vehicle) generating the sound, a direction of origin (e.g., behind and approaching the vehicle 101) of the sound, a type of vehicle 102 generating the sound (e.g., detected to be an emergency vehicle, or such is indicated via the server 140 and/or DSRC), etc.

Further, a detected sound and/or event(s) based on data 125 may correspond, i.e., be mapped, to multiple haptic outputs, i.e., a series of haptic outputs, as stated above. For example, a particular event, e.g., an impending collision, may be mapped to a single haptic output at a maximum intensity for a period of time, e.g., three seconds, whereas detecting an approaching siren may be mapped to a series of three outputs of one second each at a medium intensity. Further for example, detecting a siren couple with the vehicle 101 exceeding a posted speed limit could be mapped to a series of three outputs of one second each at a high intensity.

Further for example, in response to the vehicle 101 sensors 115 detecting one or more vehicle 102 horn sounds, the computer 105 may actuate a haptic output when the vehicles 101, 102 are traveling at high speeds, e.g., on a highway, but may not actuate the haptic output when the vehicles 101, 102 are near one another, traveling at slow speeds, e.g., during a traffic jam. For further example, the vehicle 101 computer 105 may actuate the haptic output corresponding to the detected sound of an ambulance siren when the ambulance is moving at high speeds at a distance away from the vehicle 101, but may not actuate the haptic output when the ambulance is traveling at slow speeds at the same distance away from the vehicle 101. As another example, the vehicle 101 computer 105 may determine whether to actuate the haptic output based at least in part on a planned route of the vehicle 101 determined at least in part by the vehicle 101 computer 105.

Next, in a block 220, the computer 105 and/or the portable device 135 transmits to the remote server 140 a first message that the vehicle 101 includes a hearing-impaired operator. The remote server 140 may transmit the first message to the surrounding vehicles 102. The vehicle 101 may transmit the message to the surrounding vehicles 102 by the vehicle-to-vehicle communications protocol. The transmission may notify the surrounding vehicles 102 to operate in a specific manner, e.g., maintaining a safe distance from the vehicle 101, using non-audible notifications, e.g., lights, etc. Further, vehicles 102 may then provide DSRC communications to the vehicle 101 in lieu of and/or to supplement sound communications, e.g., sirens.

Next, in a block 225, the vehicle 101 sensors 115 detect sounds and/or events. Detected sounds may originate from either inside or outside of the vehicle 101 for any purpose, and may include, e.g., sirens, HMI 120 audible notifications, e.g., related to seat belts, navigation systems, etc., and also events may be detected, e.g., based on data from the communications bus 125 as explained above. For example, ambulance sirens and direction notifications, e.g., turn left in 1 mile, etc., from the navigation system may be relayed to the operator through haptic output from the portable device 135.

The portable device 135 may detect the sounds through listening devices, e.g., microphones, etc., and transduce the sounds into haptic output. Additionally or alternatively, the portable device 135 may receive a message from the computer 105 that instructs the portable device 135 to actuate the haptic output. For example, the vehicle 101 HMI 120 may message the portable device 135 to actuate the haptic output corresponding to the vehicle 101 door being ajar, instead of the portable device 135 detecting, via listening devices, the audible notification corresponding to the open door, e.g., beeping, etc., and transducing the audible notification into haptic outputs.

Additionally or alternatively, the vehicle 101 computer 105 may receive situational messages, i.e., messages relating to the origin of the sound, e.g., from surrounding vehicles 102 and/or any surrounding communicatively coupled computer via the vehicle-to-vehicle communications protocols and/or vehicle-to-infrastructure protocols. For example, situational messages may include the speed and direction of the origin as measured by sensors 115, e.g., utilizing Doppler effect principles, etc., the identity of the origin, e.g., emergency vehicle, etc.

Next, in a block 230, the vehicle 101 computer 105 determines whether a detected sound and/or event data is mapped to a haptic output. The computer 105 may compare detected sounds to stored sounds corresponding to the haptic output using known audio interpretation and identification techniques, e.g., comparing waveforms, etc. If a detected sound is determined to be a match, i.e., within a predetermined variance, of the stored sound mapped to haptic output and/or if event data is detected mapped to a haptic output, the process 200 proceeds to a block 235. Otherwise, the process 200 proceeds to the block 240.

In the block 235, the device 135 actuates the haptic output identified in the block 230, e.g., upon receiving an instruction from the computer 105.

Following one of the blocks 210, 230, or 235, in the block 240, the vehicle 101 computer 105 determines whether the process 200 should continue. For example, the process 200 may end if the vehicle 101 turns off the process 200, if the vehicle is switched off, etc. In any case, if the process 200 should not continue, the process 200 ends following the block 240. Otherwise, the process 200 returns to the block 205.

CONCLUSION

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
   detecting, by a computer, at least one of a sound outside of a vehicle and an event indicated by a communications bus in the vehicle;
   determining, by the computer, that at least one of the sound and the event is mapped to a haptic output;
   instructing, by the computer, a portable computing device to actuate the haptic output; and
   preventing, by the computer, the portable computing device from actuating the haptic output based on a speed of the vehicle.

2. The method of claim 1, further comprising receiving, by the computer, operator input mapping the sound to the haptic output.

3. The method of claim 1, further comprising actuating, by the computer, a second haptic output based on a second detected sound.

4. The method of claim 1, further comprising, prior to detecting the sound and prior to actuating the haptic output, determining, by the computer, that a vehicle operator associated with the portable computing device is hearing-impaired.

5. The method of claim 4, wherein determining that the vehicle operator is hearing impaired is performed by recognizing that an application running on the portable device is provided for a hearing impaired user.

6. The method of claim 1, wherein the event is one of a speed of the vehicle and an impending collision of the vehicle.

7. The method of claim 1, wherein the event is a dedicated short range communication from a second vehicle.

8. The method of claim 1, wherein the haptic output includes a plurality of haptic outputs of a specified duration and at a specified intensity.

9. The method of claim 1, further comprising detecting, by the computer, the event indicated by the communications bus in the vehicle, and determining, by the computer, that the event is mapped to the haptic output.

10. The method of claim 1, wherein the event is a notification for an occupant of the vehicle.

11. A system, comprising a computer that includes a processor and a memory, the memory storing instructions executable by the processor such that the computer is programmed to:
    detect at least one of a sound outside of a vehicle and an event indicated by a communications bus in the vehicle;
    determine that at least one of the sound and the event is mapped to a haptic output;
    instruct a portable computing device to actuate the haptic output; and
    prevent the portable computing device from actuating the haptic output based on a speed of the vehicle.

12. The system of claim 11, wherein the computer is further programmed to receive operator input mapping the sound to the haptic output.

13. The system of claim 11, wherein the computer is further programmed to actuate a second haptic output based on a second detected sound.

14. The system of claim 11, wherein the computer is further programmed to, prior to detecting the sound and prior to actuating the haptic output, determine that a vehicle operator associated with the portable computing device is hearing-impaired.

15. The system of claim 14, wherein determining that the vehicle operator is hearing impaired is performed by recognizing that an application running on the portable device is provided for a hearing impaired user.

16. The system of claim 11, wherein the event is one of a speed of the vehicle and an impending collision of the vehicle.

17. The system of claim 11, wherein the event is a dedicated short range communication from a second vehicle.

18. The system of claim 11, wherein the haptic output includes a plurality of haptic outputs of a specified duration and at a specified intensity.

19. The system of claim 11, wherein the computer is further programmed to detect the event indicated by the communications bus in the vehicle, and determine that the event is mapped to the haptic output.

20. The system of claim 11, wherein the event is a notification for an occupant of the vehicle.

* * * * *